(12) United States Patent
Liu et al.

(10) Patent No.: US 11,263,243 B1
(45) Date of Patent: Mar. 1, 2022

(54) METRIC-BASED IDENTITY RESOLUTION

(71) Applicant: Jun Li, Houston, TX (US)

(72) Inventors: Yang Liu, Lk Forest Pk, WA (US); Jun Li, Houston, TX (US)

(73) Assignee: QUANTAVALUE L.L.C., Lake Forest Park, WA (US)

(*) Notice: Subject to any disclaimer, the term of this patent is extended or adjusted under 35 U.S.C. 154(b) by 0 days.

(21) Appl. No.: 17/026,248

(22) Filed: Sep. 20, 2020

(51) Int. Cl.
*G06F 16/28* (2019.01)
*G06F 16/901* (2019.01)
*G06Q 50/26* (2012.01)
*G06Q 30/00* (2012.01)
*G06Q 10/10* (2012.01)

(52) U.S. Cl.
CPC ........ *G06F 16/285* (2019.01); *G06F 16/9024* (2019.01); *G06Q 10/10* (2013.01); *G06Q 30/0185* (2013.01); *G06Q 50/265* (2013.01)

(58) Field of Classification Search
CPC .... G06Q 20/40; G06Q 20/4016; G06Q 40/02; G06Q 20/04; G06Q 40/00; G06Q 40/025; G06Q 20/382; G06Q 20/401; G06Q 30/018; G06Q 30/0185; G06Q 40/08; G06Q 50/26; G06N 20/00; G06N 3/006; G06N 7/005; G06N 3/08; G06N 5/02; G06N 5/04; G06N 5/046; H04L 67/22; H04L 67/306

USPC .................................................. 707/738
See application file for complete search history.

(56) References Cited

U.S. PATENT DOCUMENTS

| | | | |
|---|---|---|---|
| 7,458,508 B1 * | 12/2008 | Shao | G06Q 20/04 235/380 |
| 7,562,814 B1 * | 7/2009 | Shao | G06F 21/552 235/375 |
| 7,686,214 B1 * | 3/2010 | Shao | G06Q 20/382 235/380 |
| 7,793,835 B1 * | 9/2010 | Coggeshall | G06Q 20/4016 235/380 |
| 9,576,248 B2 * | 2/2017 | Hurwitz | G06N 20/00 |
| 10,521,857 B1 * | 12/2019 | Shao | G06Q 40/02 |
| 10,728,036 B2 * | 7/2020 | Ganesan | G06F 16/00 |
| 2006/0149674 A1 * | 7/2006 | Cook | G06Q 40/02 705/44 |
| 2017/0270534 A1 * | 9/2017 | Zoldi | G06F 16/24578 |
| 2019/0074974 A1 * | 3/2019 | Ganesan | H04L 9/3242 |
| 2020/0067861 A1 * | 2/2020 | Leddy | H04L 51/12 |

\* cited by examiner

*Primary Examiner* — Sheree N Brown

(57) ABSTRACT

Digital records are clustered and assigned unique individual identity across a plurality of data sources. Each record contains one or more tagged common properties, which belongs to an underlying identifiable entity. A special parameterized metric distance is calculated for all pairs of records. With adjustment of the metric parameters, the records are clustered based on a predetermined distance threshold. Based on the clustered records, the underlying identity associated with the records can be resolved.

5 Claims, 3 Drawing Sheets

METRIC-BASED IDENTITY RESOLUTION

BACKGROUND

In order to create a highly personalized user experience and detect potential fraud, identity resolution has become an increasingly important tool to support a holistic picture of customers. With the digital transform of the business world, digital records of custom profiles and transactions are becoming more abundant than ever. However, these records are often fragmented and scattered across a multitude of data sources. Identity resolution is the process of connecting these records to a single unified customer identity. With the rapidly increasing size and heterogeneity of data sources, the process of identity resolution has become more challenging. Moreover, the digital records extracted from text documents or large legacy repositories may contain noise and error. We need a more systematic approach to address these challenges and make the identity resolution process more efficient and reliable.

SUMMARY

Exemplary embodiments of systems and methods in accordance with the present invention provide for the discovery of connections between digital records so that they can be treated as records related to the underlying individual identity. A system can include a processor, a memory device having memory accessible by the processor and modules that include processor-executable instructions stored in the memory of the memory device, the instructions executable to instruct the system to model metric distances between digital records based on a set of common properties and use the distance values to correlate the records based on a threshold criteria.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
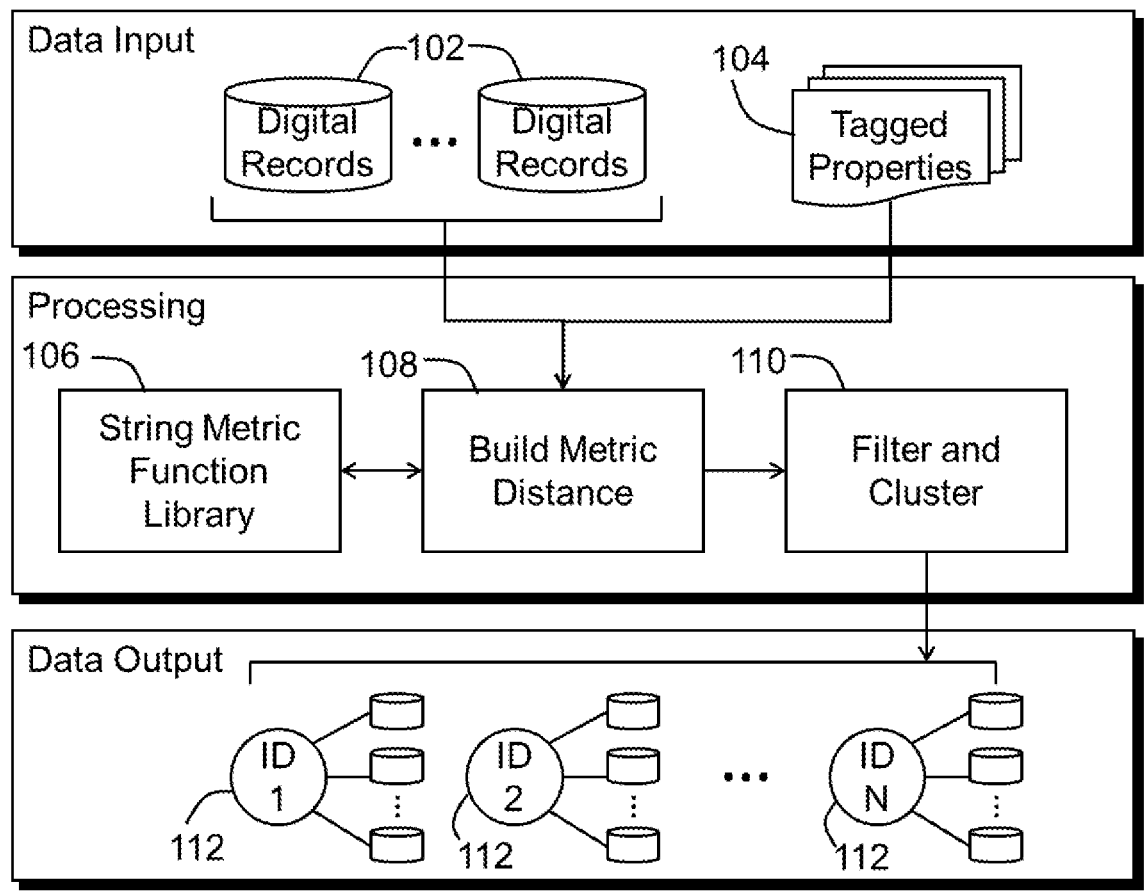
FIG. 1 illustrates a schematic representation of an embodiment of a system for resolving identity for digital records across data sources in accordance with the present invention.

FIG. 1 shows an exemplary embodiment of a system or framework 100 for resolving identity association for digital records across multiple data sources with the present invention. The input part of the system includes digital records 102 coming from a plurality of different data sources, as well as a plurality of tagged common properties 104 of the records. The data sources can be of different types and formats. The digital records are explicitly or implicitly associated with identifiable entities, including but not limited to individual persons, companies, government entities and non-profit organizations. The tagged common properties can be any property that can be associated with the identity of the entity, including but not limited to name, address, phone number, email, credit card number, social security number and date of birth/creation.

The processing part of the system includes a step of building metric distance between all the digital records 108, which may utilize a string metric function library 106. The resulting metric distances are then used by the next step of filtering and clustering the digital records. The final output of the system is a collection of clustered records 112, each associated with a unique identity.

Let $D_p(a, b)$ be the pair-wise distance between two records a and b. As an example, $D_p(a, b)$ can be calculated as $$D_p(a, b) = \prod_{i=1}^{n} [s_i \delta(a^i, b^i) + t_i], \quad [1]$$

where $a^i$ is the i-th tagged property, $\delta$ is a string metric function, like the Jaro-Winkler distance and the Levenshtein distance, $s_i$ and $t_i$ are positive scaling and translation factors for the i-th tagged property respectively. $s_i$ can be used as a weighting factor such that more weight means the corresponding property is more important. $t_i$ can be used as a smoothing factor such that a zero value means that zero-distance for the corresponding property results in zero pair-wise distance.

Once the pair-wise distances are calculated, we can construct a graph by linking records with edges corresponding to the pair-wise distances. Then a natural metric can be defined on the graph as the shortest path between two nodes. Let w(P) be the length of path P from a to b, where a and b are two distinct data records. As an example, w(P) can be defined as $$w(P) = \sum_{j=1}^{k} D_p(r_{j-1}, r_j), \quad [2]$$

where $P = \langle r_0, r_1, \ldots, r_k \rangle$, $r_0 = a$ and $r_k = b$.

As an example, the metric distance between two records a and b can be defined as $$D_m(a, b) = \min_P \{w(P) : P \text{ is a path from } a \text{ to } b\}. \quad [3]$$

Note that the threshold can be applied directly to the pair-wise distance defined in Eq. [1], to reduce the amount of calculation for finding metric distance below the threshold $\Theta$ according to Eq. [2] and [3], since for the shortest-path between two records to be below the threshold, all pair-wise distance along the path must remain below the threshold. Records within the same cluster are considered to be associated with the same identity.

Figure 2:
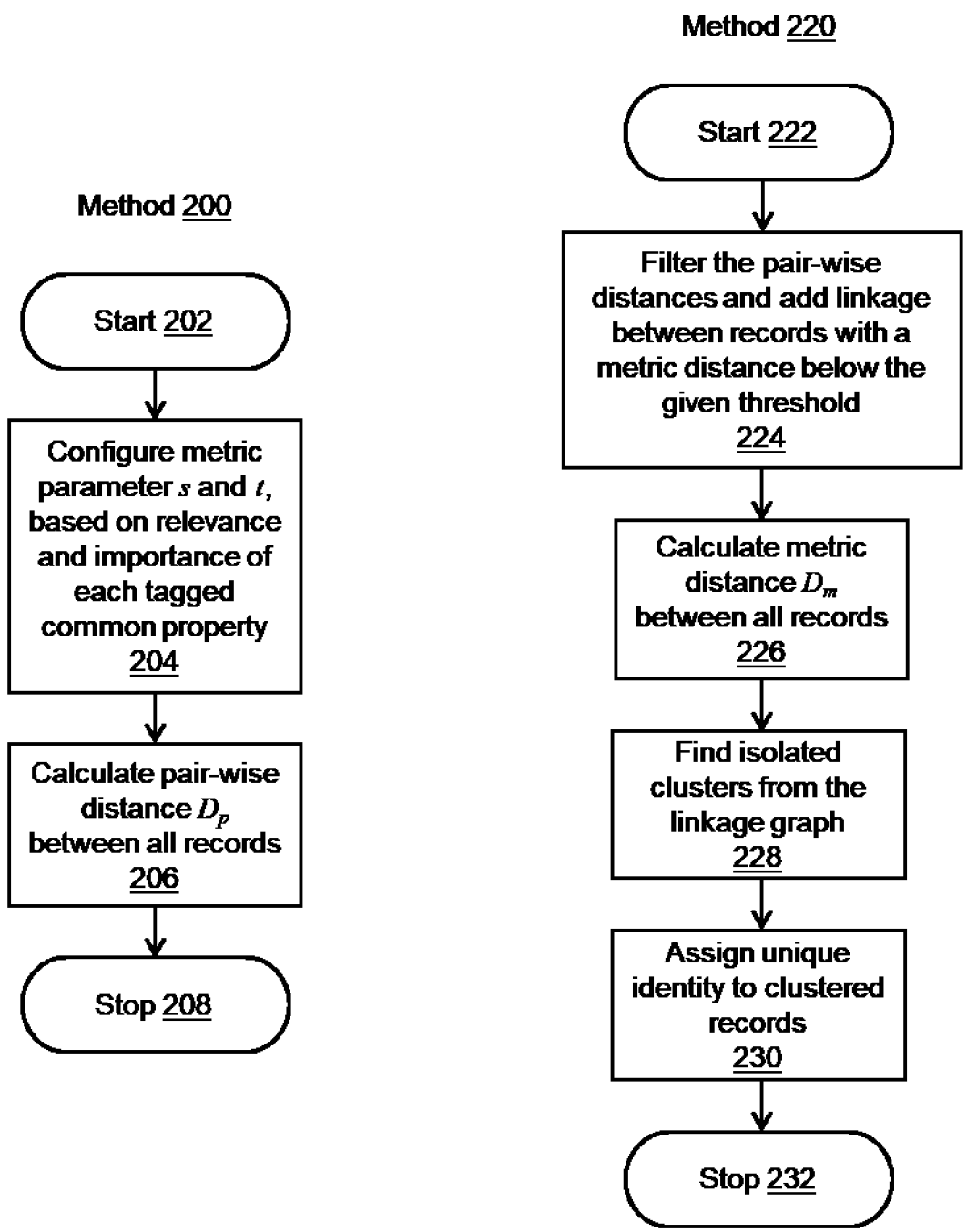
FIG. 2 illustrates an example of building metric distance between digital records and an example of filtering and clustering digital records to associate with individual identities.

FIG. 2 illustrates an example of method 200 and method 220. These methods can be used to build the metric distances and resolve the underlying identity by filtering and clustering the records.

As shown, the method 200 includes a start block 202, a configuration block 204 for configuring the parameters s and t based on relevance and importance of each tagged common property, a calculation block for calculating the pair-wise distance $D_p$ for all pairs of records according to Eq. [1], and a termination block 208.

The method 220 implements the filtering and clustering digital records based on the metric distances to establish the association between the digital records and the underlying identities. As shown, the method 220 includes a starting block 222, a filtering block 224 for filtering on the pair-wise distance $D_p$ and adding linkage between records with $D_p$ below the given threshold $\Theta$, a calculation bock 226 for calculating metric distance $D_m$ between all records according to Eq. [2] and [3], a clustering block 228 for finding isolated clusters from the linkage graph, a result processing block 230 for assigning unique identity to the clustered records, and a termination block 232.

Figure 3:
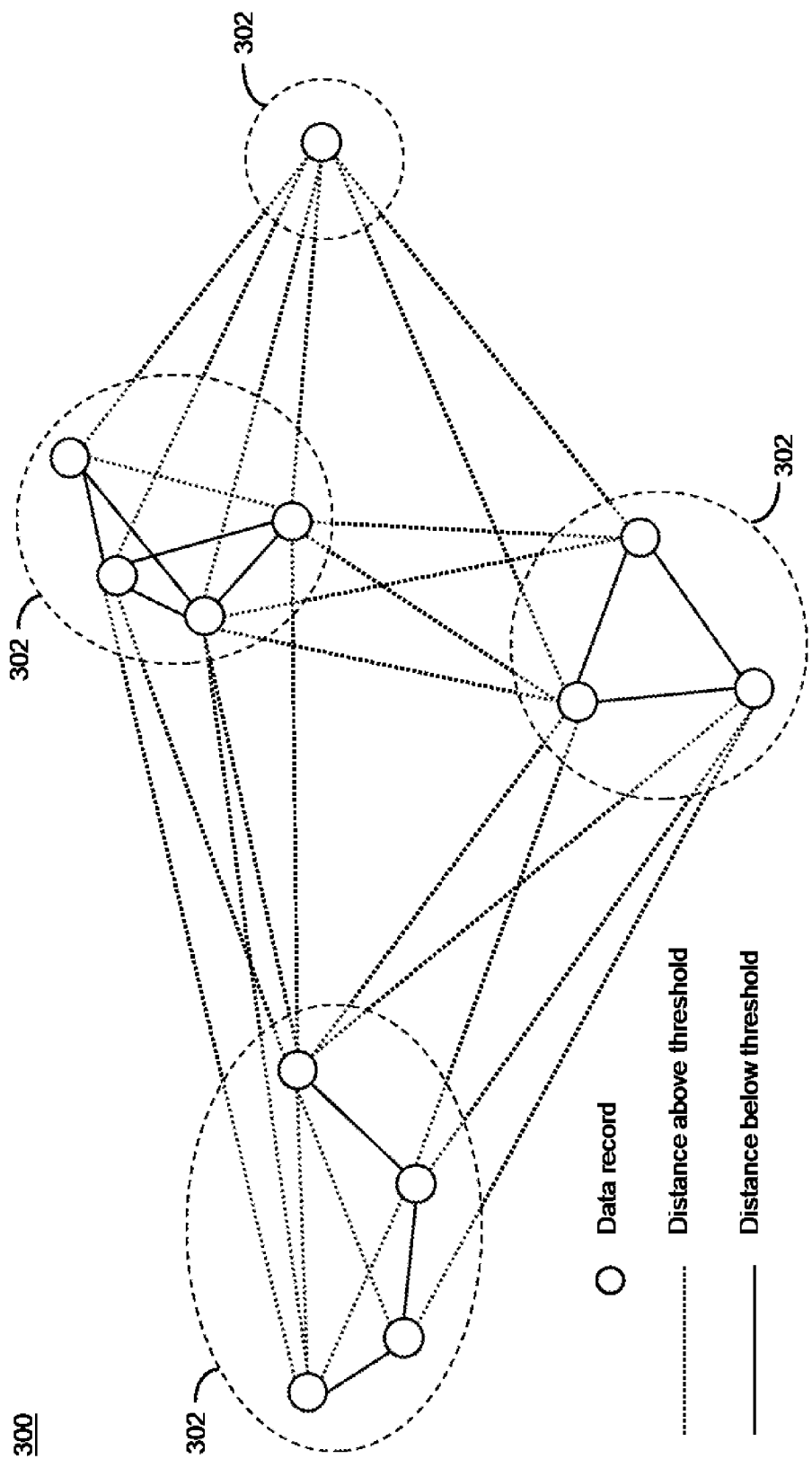
FIG. 3 illustrates an example of applying a threshold to build the distance graph with clusters of records.

FIG. 3 illustrates an example of applying a threshold to the distance graph to cluster the data records. The straight lines illustrates the pair-wise distance between the data records. The solid lines illustrates distances which are below the threshold. The dotted lines illustrates distances which are above the threshold. The clusters 302 are formed from records connected by the solid lines.

What is claimed is:

1. A computer-implemented method for resolving underlying identity for digital data records across a plurality of data sources, the method comprising:
    building a system that assigns association with individual identities for a plurality of structured or unstructured data records;
    parsing the data based on a set of tagged common properties;
    using the parsed common properties to derive a calculated distance between pairs of data records, wherein the method of deriving a calculated distance comprises defining a property-wise metric distance $\delta$, and calculating a record-wise metric distance D(a, b), where (a, b) is a pair of records and each record has n common properties, by transforming property-wise metric distances $\delta(a^i, b^i)$, where $(a^i, b^i)$ is a pair of properties consisting of the i-th property for a and b respectively, with scaling factors $s_i$ and translation factors $t_i$, according to a formula $$D(a, b) = \prod_{i=1}^{n} [s_i \delta(a^i, b^i) + t_i];$$

generating a linkage graph by establishing linkage between pairs of data records with a calculated distance below a given threshold, filtering the calculated distances and adjusting the scaling and translation factors in the distance calculation accordingly; and
    clustering the data records based on the linkage graph and assigning each clustered data records a unique identity.

2. The method of claim 1, wherein:
    each common property comprises a value string comprising at least one of alpha-numeric characters, non-alphanumeric characters and spaces; and
    each data record comprises at least one of the properties in the set of tagged common properties.

3. The method of claim 1, wherein finding a property-wise metric distance includes a preprocessing step of transforming any upper case of alpha-numeric character in a value string into a corresponding lower case alpha character.

4. A system for resolving underlying identity for digital data records across a plurality of data sources, the system comprising:
    a processor;
    a memory device having memory accessible by the processor; and
    processor-executable instructions stored in the memory of the memory device, the instructions executable to instruct the system to:
    building a system that assigns association with individual identities for a plurality of structured or unstructured data records;
    parsing the data based on a set of tagged common properties;
    using the parsed common properties to derive a calculated distance between pairs of data records, wherein the method of deriving a calculated distance comprises defining a property-wise metric distance $\delta$, and calculating a record-wise metric distance D(a, b), where (a, b) is a pair of records and each record has n common properties, by transforming property-wise metric distances $\delta(a^i, b^i)$, where $(a^i, b^i)$ is a pair of properties consisting of the i-th property for a and b respectively, with scaling factors $s_i$ and translation factors $t_i$, according to a formula $$D(a, b) = \prod_{i=1}^{n} [s_i \delta(a^i, b^i) + t_i];$$

generating a linkage graph by establishing linkage between pairs of data records with a calculated distance below a given threshold, filtering the calculated distances and adjusting the scaling and translation factors in the distance calculation accordingly; and
    clustering the data records based on the linkage graph and assigning each clustered data records a unique identity.

5. A non-transitory computer-readable media comprising a plurality of instructions which, executable by a processor, cause the processor to:
    building a system that assigns association with individual identities for a plurality of structured or unstructured data records;
    parsing the data based on a set of tagged common properties;
    using the parsed common properties to derive a calculated distance between pairs of data records, wherein the method of deriving a calculated distance comprises defining a property-wise metric distance $\delta$, and calculating a record-wise metric distance D(a, b), where (a, b) is a pair of records and each record has n common properties, by transforming property-wise metric distances $\delta(a^i, b^i)$, where $(a^i, b^i)$ is a pair of properties consisting of the i-th property for a and b respectively, with scaling factors $s_i$ and translation factors $t_i$, according to a formula $$D(a, b) = \prod_{i=1}^{n} [s_i \delta(a^i, b^i) + t_i];$$

generating a linkage graph by establishing linkage between pairs of data records with a calculated distance below a given threshold, filtering the calculated distances and adjusting the scaling and translation factors in the distance calculation accordingly; and clustering the data records based on the linkage graph and assigning each clustered data records a unique identity.

* * * * *